Dec. 14, 1926.

P. MacGAHAN

ELECTRICAL MEASURING INSTRUMENT

Filed Feb. 20, 1924

1,610,566

WITNESSES:
Carl J. Loesch
F. H. Miller

INVENTOR
Paul Mac Gahan
BY
Ebesley G. Barr
ATTORNEY

Patented Dec. 14, 1926.

1,610,566

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 20, 1924. Serial No. 694,025.

My invention relates to electrical measuring instruments and particularly to thermoammeters and voltmeters.

One object of my invention is to provide a measuring instrument in which both elements of a device for deriving a secondary current from a main current shall be carried by a movable element, responsive to the secondary current, to eliminate connections between stationary and movable points in the secondary-current circuit.

Another object of my invention is to provide means for preventing the losses ordinarily caused in the connections between stationary and movable electrical elements.

Heretofore, in measuring quantities by means of a heater, a thermo-couple and a direct-current responsive movable element, it has been usual to mount the heater and couple stationarily and to conduct the couple current to the movable element by flexible or slip connections. Loss occurs in any connection of this kind; the extent of the loss depending on the magnitude and character of the current, the size of the conductors and other factors.

The current generated by a thermo-couple is very weak and it is, therefore, desirable to prevent the loss of any portion of it, before it is conducted to a place where it is needed.

In practicing my invention, I provide a movable meter element that is energized by direct current, generated by a thermocouple and upon which is mounted the thermocouple and a heater that is included in a main circuit to be measured. The flexible or slip connections to the movable element are in the main circuit and the derived or secondary circuit is free from losses due to such connections.

Figure 1:
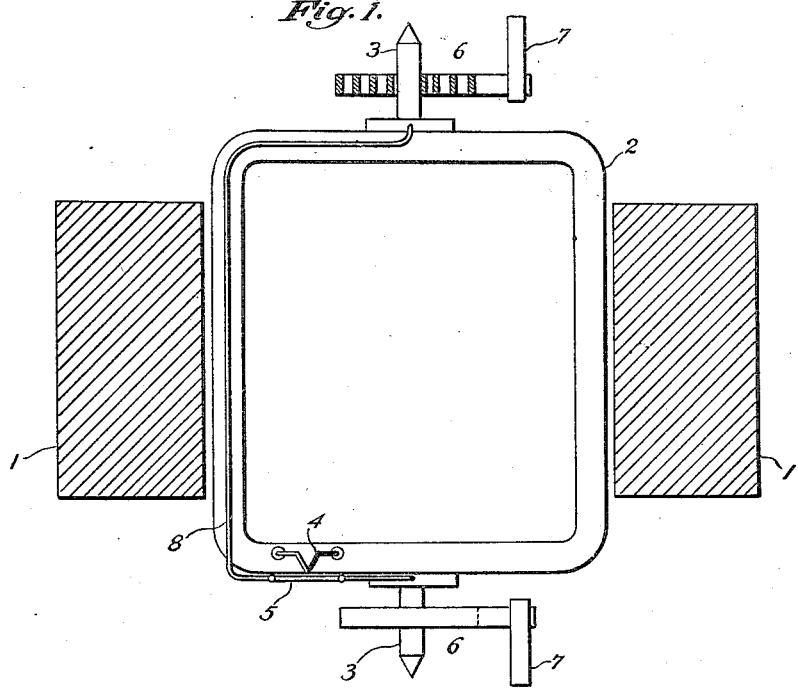
Figure 2:
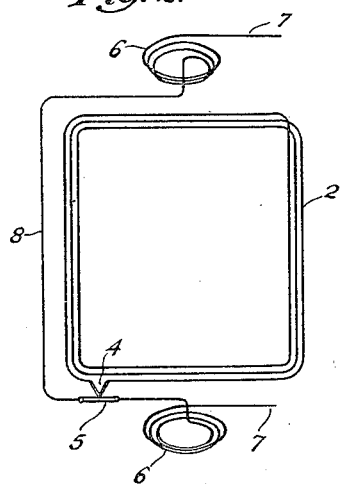

Figure 1 of the accompanying drawings is a side view, partially in elevation and partially in section, of portions of a meter embodying my invention, and Fig. 2 is a circuit diagram of the device shown in Fig. 1.

The instrument comprises, in general, pole ends 1 of a permanent field magnet, a direct current coil 2, trunnions 3 for pivotally mounting the coil 2, a thermocouple 4 included in the circuit of the coil 2, and a heater 5 and control springs 6 connected between stationary terminals 7 of the circuit to be measured.

The thermo-couple 4 is carried by the coil 2, in series relation to the several turns of the coil and is, therefore, free from losses caused by flexible or slip connections usually present in thermo-meters of this character.

The heater 5 is also carried by the coil 2, in series with a conductor 8 that extends between the terminals 7, through the springs 6. By thus placing the flexible or slip connections in the main circuit, current loss caused by the connections becomes a negligible factor and the instrument, as a whole, is rendered much more effective in operation.

By my invention, the relatively small thermo-couple current is utilized to best advantage to render the instrument more positive and effective in operation.

While I have shown and described a particular form of my invention, changes may be effected therein without departing from the spirit and scope thereof, as set forth in the appended claims.

I claim as my invention:

1. A meter comprising a field magnet, a movable element embodying a coil and a thermo-couple in circuit with the coil, and a heater for the couple carried by the movable element and heated by means electrically independent of said circuit.

2. A meter comprising a field magnet, a movable element including a coil traversed by direct current only and a thermo-couple in circuit with the coil, and a heater for the couple carried by the movable element.

3. A meter comprising a field magnet, a movable element including a coil and a thermo-couple constituting a circuit energized by the couple, a heater for the couple carried by the element, and means for conducting current to the heater from a circuit electrically independent of said circuit.

4. A meter comprising a field magnet, a movable element including a coil and a thermo-couple constituting a circuit energized by the couple, a heater for the couple carried by the element, and flexible leads for conducting current to the heater from an alternating-current circuit electrically independent of said circuit.

In testimony whereof, I have hereunto subscribed my name this first day of February, 1924.

PAUL MacGAHAN.